US012667220B2

(12) United States Patent     (10) Patent No.:   US 12,667,220 B2

Font Ventura et al.     (45) Date of Patent:    Jun. 30, 2026

(54) DEVICE FOR HEATING FILLED BRIOCHES

(71) Applicant: INBROOLL INDUSTRIES, S.L.,
Palol de Revardit (ES)

(72) Inventors: Marc Font Ventura, Cervia de Ter
(ES); Jaume De Palol Masdevall,
Banyoles (ES); Miquel Coma Vila,
Banyoles (ES); Rafael Hesse, Bescano
(ES); Irene Pijoan Pages, Banyoles
(ES)

( * ) Notice:   Subject to any disclaimer, the term of this
patent is extended or adjusted under 35
U.S.C. 154(b) by 923 days.

(21) Appl. No.: 17/944,358

(22) Filed:   Sep. 14, 2022

(65)       Prior Publication Data

US 2023/0000283 A1    Jan. 5, 2023

Related U.S. Application Data

(63) Continuation-in-part of application No. 16/636,553,
filed as application No. PCT/EP2018/070718 on Jul.
31, 2018, now Pat. No. 11,474,503.

(30)       Foreign Application Priority Data

Aug. 4, 2017    (ES)  ............................... ES201730946

(51) Int. Cl.
     *A47J 37/06*       (2006.01)
(52) U.S. Cl.
     CPC ................................ *A47J 37/0611* (2013.01)
(58) Field of Classification Search
     CPC ...................... A47J 37/0611; A47J 2037/0617
     USPC ......................................................... 99/372
     See application file for complete search history.

(56)       References Cited

U.S. PATENT DOCUMENTS

| | | | | | |
|---|---|---|---|---|---|
| 3,978,238 | A | * | 8/1976 | Frey ...................... | A47J 27/004 |
| | | | | | 99/332 |
| 5,255,595 | A | * | 10/1993 | Higgins ............... | A47J 37/0611 |
| | | | | | 219/524 |
| 5,937,742 | A | * | 8/1999 | Steeb ................... | A47J 37/0611 |
| | | | | | 99/380 |

FOREIGN PATENT DOCUMENTS

EP      2606786 A1 *   6/2013  .......... A47J 37/0611

OTHER PUBLICATIONS

Machine Translation of EP-2606786-A1 (Year: 2025).*

* cited by examiner

*Primary Examiner* — Edward F Landrum
*Assistant Examiner* — Thomas J Ward
(74) *Attorney, Agent, or Firm* — Eugenio J. Torres-Oyola;
Victor M. Rodriguez-Reyes; Rafael Rodriguez-Muriel

(57)         ABSTRACT

A device (1) for heating filled brioches preferably filled with
ice-cream, comprising an upper subassembly (3) and a lower
subassembly (4) linked by one or more joints or hinges (10).
Each one of the subassemblies (3, 4) includes a heating plate
(14) with a cavity (14a) intended to receive the filled
brioche, or other similar product, in order to heat it, arranged
so that in an operative position they overlap one another.
Each heating plate (14) is positioned on top of a heat transfer
plate (16) enclosed in a thermo-insulating layer (13), except
for an opening to allow contact between the heating plate
(14) and the heat transfer plate (16). The heating plates (14)
are releasable from the subassembly by means of one or
more releasable fastening elements protruding from the
heating plate (14) and inserted in one or more slots (3c, 4c)
of either casing of the subassemblies.

16 Claims, 5 Drawing Sheets

DEVICE FOR HEATING FILLED BRIOCHES

CROSS REFERENCE TO RELATED APPLICATIONS

This application is a continuation in part of, and claims priority to, U.S. Application Ser. No. 16/636,553, filed Apr. 2, 2020, and entitled "Device for heating filled brioches", the entire contents of which are incorporated by reference.

TECHNICAL FIELD

The proposed invention relates to a device for heating filled brioches, especially those filled with a frozen substance. The invention pertains to the field of devices or electrical appliances intended for the preparation of foods intended, in particular, for the catering sector.

STATE OF THE ART

In the current state of the art similar devices are known whose main function is the preparation of waffles starting from dough, also available on the market. These devices, of "sandwich press" or "waffle iron" type, used for the preparation of waffles, are disclosed, for instance, in U.S. Pat. No. 9,554,670 and WO 2014036588.

From said documents, a device is known for the preparation of hot dough by means of at least two heating plates, which may be removable, and each heating plate is provided with a cavity to receive the dough that is to be heated.

Said heating plates are arranged inside the device, which is divided into an upper subassembly and a lower subassembly, the latter having the function of a base of the device, both subassemblies being hinged to one another. The heating plates inside the device are arranged, at least one of them being located in the upper subassembly and at least a second one in the lower subassembly and arranged in an operative position overlapping one another.

These devices also include at least one heat transfer plate located in at least one of the upper or lower subassemblies that has an associated thermostat which is configured to regulate the temperature.

These devices have several problems which derive from the fact that the heating plates are attached to at least one of the subassemblies and do not have a system providing some degree of rocking movement or play that allows to guarantee an optimal contact between said oppositely arranged heating plates when closing the device, such that, if the amount of dough that is placed into the cavities of the heating plates is not uniformly distributed, the heat transfer throughout the dough will be variable and, therefore, the obtained brioche will not have uniform heating. On the other hand, the fact that the plates do not completely contact each other when oppositely arranged may cause leakage or spillage of the frozen substance filling which would seep out of the brioche.

U.S. Pat. No. 9,554,670 discloses a device of said type that offers the possibility to remove the heating plates, but neither specifies nor describes how or where the heating plates are attached, how they are removed or which the specific elements are that may be removed so that they can be washed or substituted. Therefore, it does not provide the necessary information to carry out the removal of the heating plates or other possible elements.

WO2007/12702 discloses a dual-surface grill comprising a support structure, a lower cooking platen mounted to said support structure, an upper cooking platen mounted to said support structure for movement between a cooking orientation and a non-cooking position, the platens being at least substantially parallel to each other when in the cooking orientation and a distance sensing device for sensing the distance between the platens when the platens are in the cooking orientation and when the upper platen first contacts a food item on the lower platen. The cooking plates are heated to cooking temperature by one or more heating units which may be gas or electric.

WO2015/164489 refers to a grill device for simultaneous two-sided cooking comprising an upper cooking platen and a lower cooking platen, the upper cooking platen mounted for at least one degree of freedom of movement relative to the lower cooking platen for movement between a cooking position and a non-cooking position, and the lower cooking platen mounted in generally opposed relation to the upper cooking platen in the cooking position.

US2010/186601 refers to a two-sided griddle-type cooking device comprising an upper griddle mechanism for use with a cooking apparatus having a griddle plate with an upwardly facing cooking surface.

BRIEF DESCRIPTION OF THE INVENTION

The invention aims to provide a device for heating filled brioches, generally containing a frozen substance. The device comprises, according to a structure already known in the state of the art, for example, from one or more of the recited background items:

an upper subassembly and a lower subassembly, the latter carrying out the function of a base and both being hinged to one another;

two or more removable heating plates, each one provided with a cavity to receive the product, one or more of said heating plates installed in the upper subassembly and the other one or more heating plates installed in the lower subassembly, arranged so that in an operative position, overlap one another;

two or more light indicators, to display the operative state of the device and report that the heating plates have reached a defined determined temperature; and at least one thermostat that is configured to regulate the temperature of said heating plates.

In particular, the present invention provides a device for heating filled brioches, especially with a frozen dough filling, which includes:

an upper subassembly and a lower subassembly that carries out the function of a base and which are hinged to one another;

two or more heating plates, in thermal contact with a heat transfer plate having a heating thermal resistor attached thereto, one or more of said heating plates being installed in the upper subassembly and the other one or more heating plates being installed in the lower subassembly, arranged in an operative position overlapping one another;

loaded elastic elements that press said heating transfer plate against said heating plates; and wherein each of said heating plates is linked to the upper or the lower subassembly wherein it is installed by means of at least one fastening element that allows for some limited shifting of the heating plate relative to the respective subassembly, allowing separating and removing the heating plate from the subassembly;

each of said heating plates is provided with a substantially semi spherical cavity for receiving the product;

each heat transfer plate and heating thermal resistor are housed in a respective thermal insulating enclosure supported in the respective upper or lower subassembly and loaded by said elastic elements, which press said thermal insulating enclosure against the corresponding heating plate, ensuring, through an opening of said thermal insulating enclosure, an optimal contact of the heat transfer plate with the heating plate, and there existing guide columns configured to allow a guided shifting of the enclosure along a shifting stroke, and said thermal insulating enclosure comprises a thermo-insulating layer, except for an open area, in correspondence to said opening of the enclosure, for abutment of the heat transfer plate with the heating plate; and the thermal insulating enclosure is thermostatically protected; and wherein each fastening element of the heating plates to the corresponding upper or lower subassembly comprises at least one elastic tab engaging a corresponding slot in the corresponding upper or lower subassembly, each slot having a vertical extension and each tab having a vertical extension, the vertical extension of the slot being greater than the one of the corresponding tab.

The heating plates are heated, for example, by means of a resistor, embedded or fitted in the plate itself or attached thereto.

The heating plates used have a configuration which adequately adapts to the corresponding subassembly, adopting, for instance, quadrangular geometry. A cavity exists in the centre of each surface with a prescribed form or pattern in order to shape the final edible product, generally according to a prescribed substantially hemispherical geometry to produce a brioche with a substantially spherical geometry. However, brioches with different geometries can also be produced by providing a cavity with a suitable form.

According to the proposal of the present invention, the device for heating filled brioches is characterized in that each of said removable heating plates is linked to the upper or lower subassembly wherein it is installed by means of at least one preferably releasable attachment or fastening element, which allows for the relative shifting of the heating plate relative to the respective subassembly wherein it has been inserted, and in thermal contact with a heat transfer plate that has a heating thermal resistor attached or connected thereto.

In one preferred embodiment of the invention, the heat transfer plate and the heating thermal resistor are housed in an enclosure supported in the respective upper or lower subassembly on loaded elastic elements, which press said enclosure against the corresponding heating plate, ensuring, by means of an opening of said enclosure, an optimal contact with the heat transfer plate, and there existing guide columns configured to allow a guided limited shifting of the enclosure along a shifting stroke.

According to one exemplary embodiment, said attachment element is releasable and is formed by an elongated piece of an elastic and/or compressible material which does not deform easily, such as, for instance, a tab, a flange or a piece of equivalent functionality, said tab being attached to one of said subassemblies by means of a through slot in each of the subassemblies and said tab being linked to a heating plate. In an alternative embodiment, it is contemplated that two releasable fastening elements be arranged on opposite side faces of each heating plate and, therefore, each of the subassemblies has two slots for attaching both tabs.

Said heat transfer plate is surrounded by a thermoinsulating layer, except for an area where it has a wide opening—for instance, a central area—that allows for a direct contact of said heat transfer plate with the heating plate to which it is attached while at same time providing an efficient protection of the electrical parts of the device.

The arrangement of said loaded elastic elements, preferably preloaded springs or elastic elements, will be adapted to the geometry of the supporting enclosures that house the heat transfer plates in order to ensure their correct stability, such that preferably four loaded springs will be used, one being located on the back side of each of the corners of the heat transfer plate wrapped by the thermoinsulating layer.

In an alternative exemplary embodiment, it is contemplated that the device should include a lower subassembly which includes two or more independent heating plates, in an adjacent position and the upper subassembly should consist of an equivalent number of independent heating plates, complementary to the heating plates of the lower subassembly, said plates of the upper and lower subassemblies being in an operative position, mutually opposed and overlapping. This arrangement allows an increase in the production capacity of the device and, in addition, the configurations of the cavities of one and other plates may be different, whereby different brioches may be produced. In this case, furthermore, the heat transfer plates (in thermal contact with each group of two opposing heating plates), respectively supported in the upper and lower subassembly, are controlled by an independent regulating thermostat.

BRIEF DESCRIPTION OF THE FIGURES

The former and other advantages and characteristics will be more fully understood from the following detailed description of an exemplary embodiment with reference to the attached drawings, which must be understood as illustrative and non-limiting, wherein.

DETAILED DESCRIPTION OF AN EMBODIMENT

The attached figures show several exemplary embodiments of the present invention having an illustrative non-limiting character.

It will be understood that different parts that constitute the invention described in an embodiment may be freely combined with the parts described in other different embodiments, even if such a combination has not been explicitly explained or shown, provided that no prejudice results from the combination.

It should be noted that any description which only describes one of the subassemblies of the device, and the components or pieces which form it, will be valid or applicable, only in the corresponding cases, to the subassembly that is not mentioned.

Figures 1A, 1B:
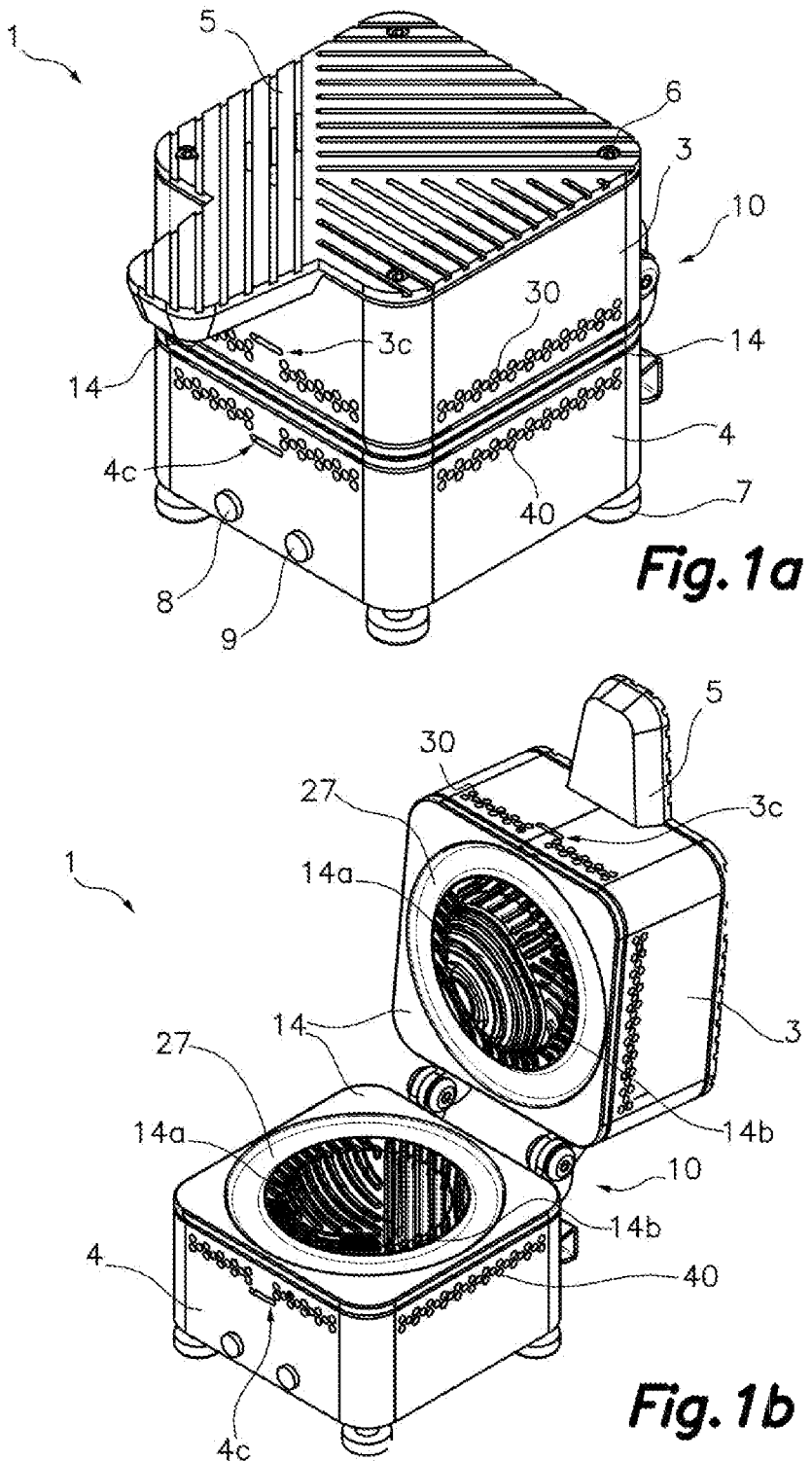
FIGS. 1a and 1b show, respectively, a perspective view of the device of the invention in closed and opened positions, respectively.

FIG. 1*a* illustrates a device 1 for heating filled brioches arranged in an operative position for heating a brioche.

Said heating device 1 is formed by an upper subassembly 3, a lower subassembly 4, a decorative closing plate 5, at least one joint 10 such as a hinge, supporting elements or feet 7, which preferably allow to adjust the height of the device or level the same relative to a supporting top or surface, two light indicators 8 and 9, preferably of LED or neon type, wherein one of them indicates the operative state of the device 1, preferably by the use of a green colour, and the other one indicates whether the heat transfer plates 16 have reached a predetermined baking temperature or a user-defined temperature, preferably by the use of a red colour.

The upper subassembly 3 and the lower subassembly 4 are preferably linked by two joints 10, in this case two hinges. However, a single joint 10 could suffice. It is also possible to have more than two joints 10. Said hinges 10 are formed (see FIGS. 2 and 3*b*) by two fixtures or appendages 3*a* and 4*a* that respectively protrude from each subassembly 3 and 4 and are linked by means of a cylindrical pin 11. The walls of the casing of both subassemblies 3 and 4 have a series of bores 30, 40, distributed on the entire surface proximal to the heating area that allow for an optimal ventilation of the interior of the device 1, in addition to at least one slot 3*c*, 4*c*, preferably two, arranged on opposite walls of the casing of each subassembly 3 and 4, which are used for engaging or removing heating plates 14 (seen in FIG. 1*b*) by means of at least one releasable fastening element, not seen in this FIG. 1*b*.

The decorative closing plate 5 is attached to the subassembly 3 by means of a number of, preferably four, screws 6, arranged on each corner of said plate 5. In this particular example, the plate 5 is made of a non-thermal conductive material, for example, wood, and it has a fixture that overhangs from the device 1, used as a handle, that allows to raise or lower the upper subassembly 3, swinging around said hinges. Said plate 5 also has through slots that allow for additional ventilation of the upper subassembly 3 heating elements of the device 1, which complements the ventilation by the bores 30, 40. The plate 5 can also be attached to the upper subassembly 3 by other kind of permanent or non-permanent attaching means, such as glue, rivets, stitches, nails, etc.

The supporting feet 7 act as adjustable supports of the lower subassembly 4, which carry out the function of a base of the device 1. Preferably, four supporting feet 7 are used, each one arranged in a corner of the lower subassembly 4, thus providing greater stability to the device 1.

FIG. 1*b* illustrates the device 1 of FIG. 1*a*, for heating filled brioches, arranged in the open position, without any product, wherein the upper subassembly 3 and the lower subassembly 4 are arranged at 90° to each other. Both heating plates 14 of each upper 3 and lower 4 subassembly and their respective cavities 14*a*, intended to receive the filled brioches; for example, of a frozen substance; for their heating, can be seen.

FIG. 1*b* also illustrates the peripheral channel 27 provided at the periphery of the cavity 14*a* of both the upper and lower heating plates 14. When the upper and lower subassemblies 3, 4 are closed, the upper and lower peripheral channels 27 face and overlap each other defining a peripheral cavity 28 (see FIG. 3*b*). Said peripheral cavity 28 collects any leak of frozen product with which the brioche is filled, avoiding leakage to the outside of the device 1 and to the internal components thereof.

In the embodiment shown, the peripheral channel 27 is located adjacent to a sealing portion 14*b*, which is located adjacent to the edge of the cavity 14*a*, i.e., the sealing portion 14*b* is located between the peripheral channel 27 and the cavity 14*a* of a heating plate 14. Said sealing portion 14*b* surrounds the cavity 14*a* and when faced and overlapping with the opposite sealing portion 14*b*, creates a sealing flange to the brioche that prevents leakage of the frozen product to the outside of the brioche. In the embodiment shown, the sealing portion 14*b* protrudes form the peripheral channel 27, which is formed as a groove on the surface of the heating plate 14. Said peripheral channel 27 can be concentric with the cavity 14, or not. In any case, the upper and lower peripheral channels 27 are shaped so that they overlap each other when the device 1 is in its operative position. In the embodiment shown, the heating plates 14 are dimensioned so that its edges are substantially aligned, i.e., substantially flush, with the outer casing of the upper and lower subassemblies 3,4, as can also be seen in FIG. 3*b*. This has the benefit that even if a leakage of frozen product occurs that fills the peripheral cavity 28, the leaked product would fall from the edge of the heating plate 14 to the outside of the device 1, thereby preventing leakage to the internal components of the device 1, which is something that could damage them and could be very difficult to clean. On the contrary, if the heating plates 14 were larger than the corresponding subassembly 3, 4, so that they protrude from the casing, there would be a risk of burn as it is very hot. Therefore, it is preferred that the heating plate 14 is substantially flush with the outer casing of the corresponding subassembly 3,4 as it provides the optimal compromise between ease of cleaning and avoidance of burns.

Figure 2:
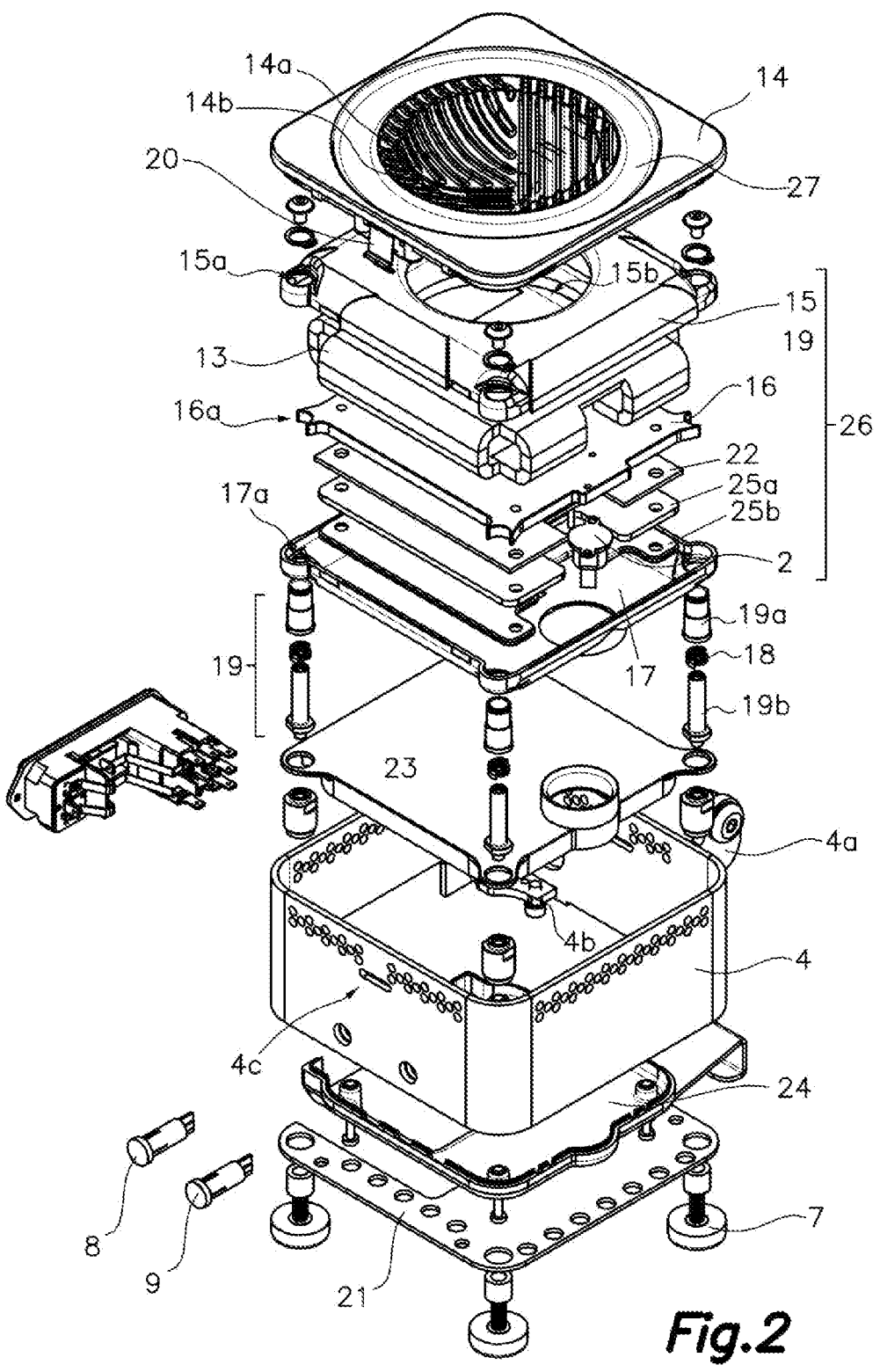
FIG. 2 shows an exploded view of the lower subassembly of the device of the proposed invention.

FIG. 2 illustrates an exploded view of the lower subassembly 4 of the proposed device 1, and shows how the heating plate 14 overlaps the heat transfer plate 16, which is wrapped by the thermoinsulating layer 13 except for a face wherein an opening exists. A releasable attachment or fastening element that allows separating and removing the heating plate 14 from the subassembly 4 is also illustrated.

Figures 3A, 3B:
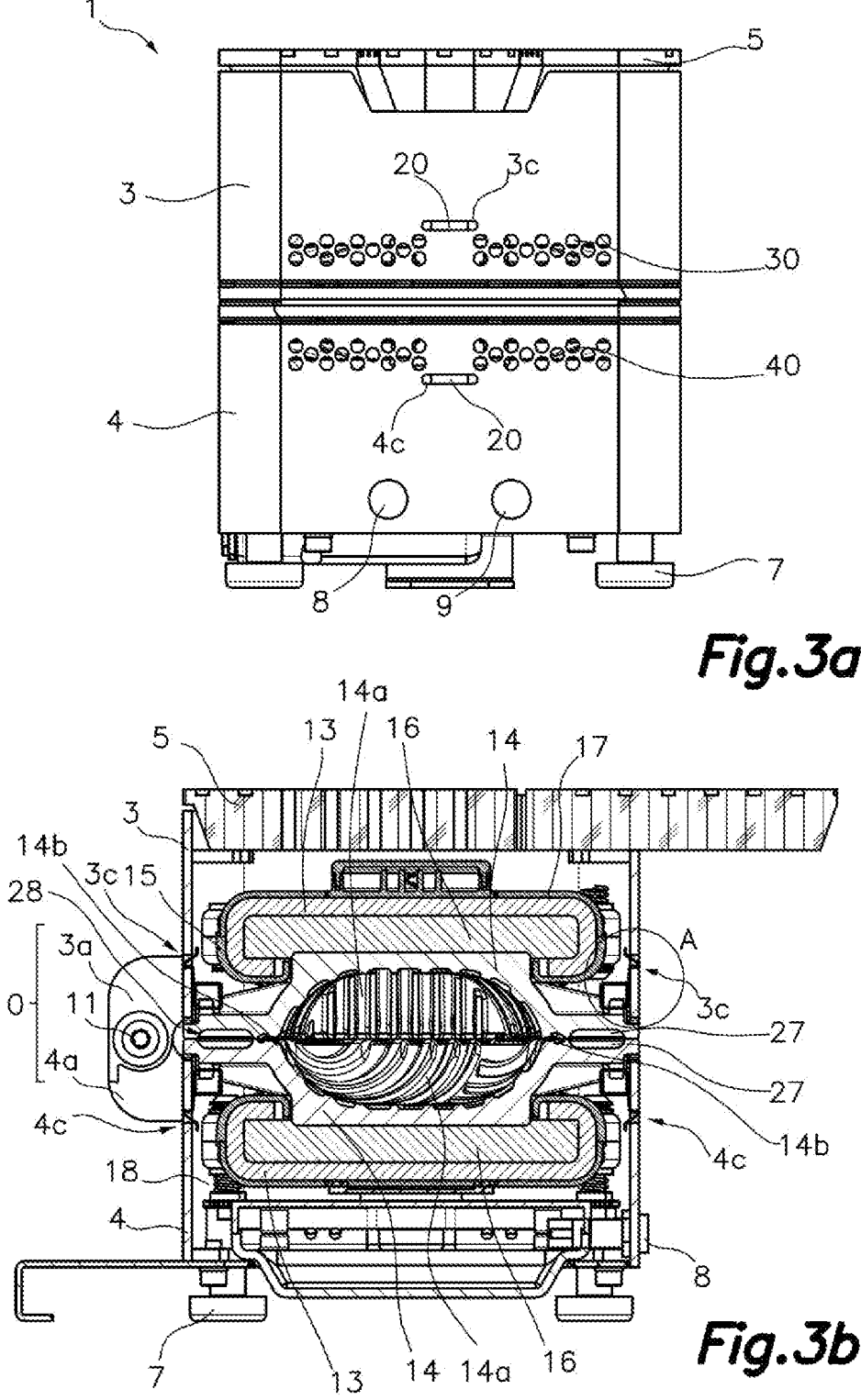
FIGS. 3a, 3b and 3c show an elevation view of the device and of its respective section along a central vertical plane, respectively, and a detail that allows a better view of the releasable fastening element arranged in one of the slots.

The releasable fastening element is formed, in this embodiment, by an elastic tab 20 that protrudes vertically from at least one of the side faces of the heating plate 14, preferably from a centred position of the side face (see mounting arrangement of FIG. 3*b*). Said tab 20 is attached to the lower subassembly 4, a portion of the tab 20 being retained by a slot 4*c* of the lower subassembly 4, such that the releasing and subsequent removal of the heating plate 14 are feasible by applying a compression force or pressure on the tab 20, by means of an instrument or tool whose end may be easily inserted into the slot 4*c*, or simply by hand.

The heating plates 14 and heat transfer 16 plates, both of which are part of the lower subassembly 4 and of the upper one 3, are arranged in such a way that each heat transfer plate 16, which has a heating thermal resistor 22 attached thereto, is wrapped (except for a face where an opening exists for abutment with the corresponding heating plate 14) by a thermoinsulating layer 13. Said heating thermal resistor 22 is controlled by an adjustable thermostat 2 in contact with the heating plate 14. In this way, each set, including a heating plate 14 and heat transfer plate includes its own thermostat, which increases the safety of the device.

Each heat transfer plate 16 is housed inside a thermally insulated enclosure 26, formed by two half enclosures 15 and 17, which form a single enclosure 26, when coupled to one another, the half enclosure 15 having an open area 15*b* that allows the rear surface of the heating plate 14, arranged on the back side of the cavity 14*a* of the heating plate 14, to be in thermal contact with the heat transfer plate 16. The heating thermal resistor 22 is pressed against the heat transfer plate 16 by means of an aluminium plate 25b and an additional insulating layer 25a is located therebetween. Thus, in this particular exemplary embodiment, the assembly of the heating thermal resistor 22, the thermostat 2, the heating plate 14, the aluminium plate 25b and the insulating layer 25a forms a multilayer assembly or enclosure 26 (see also FIG. 4), the different plates and layers being stacked and overlapping. Such an arrangement is derivable from said FIG. 2. This arrangement provides a compact and efficient apparatus 1 for heating brioches and at the same time a protection against heating of the electrical parts of the device is achieved.

Each heating plate 14 is preferably made of a material with a high thermal conductivity.

Figure 4:
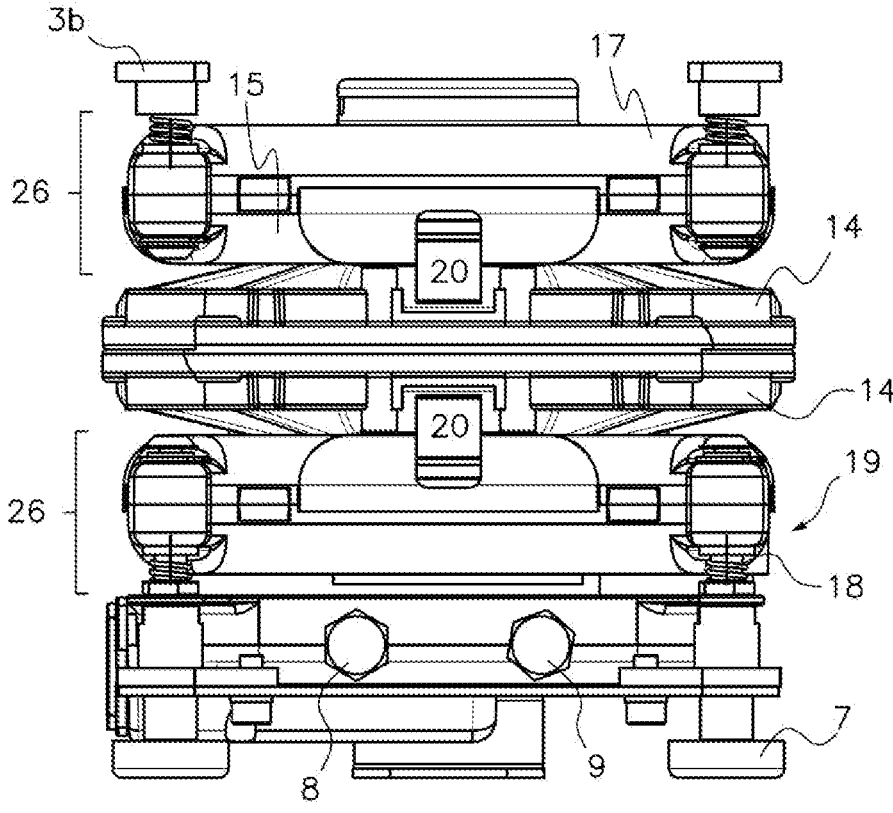
FIG. 4 shows a simplified elevation view of the device, wherein only the arrangement of some of the essential elements of the proposed solution has been portrayed for an improved understanding thereof.

Although in FIG. 2 only the lower thermally insulated enclosure 26 has been depicted, the upper subassembly 3 comprises a similar arrangement of heating plate 14, heat transfer plate 16, heating thermal resistor 22, thermostat 2, aluminium plate 25b, insulating layer 25a, etc. although arranged in an opposite orientation facing the lower thermally insulated enclosure 26 (see FIGS. 3b and 4).

The provision of an adjustable thermostat 2 for each thermally insulated enclosure 26 allows for a fine adjustment of the temperature of each heat transfer plate 16 and, consequently, of each heating plate 14. The thermostats 2 of the upper and lower enclosures 26 can be connected so that if one fails, the other can still control both heat transfer plates 16 or so that if one fails, the operation of the device is stopped.

The heat transfer plate 16 and both half enclosures 15 and 17 surrounding the thermoinsulating layer 13 have lugs with through bores 15a, 16a and 17a on their four corners, the through bores 16a having semi-circular geometry, a guide column 19—formed by a first outer guide column 19a and a second inner guide column 19b inside the former—going therethrough, on which a loaded elastic element 18, preferably a spring, is coaxially mounted. Each guide column 19, specifically said first outer guide column 19a, is supported on a support 4b attached to each of the four corners of the interior of a prismatic casing that delimits the lower subassembly 4 (see FIG. 2).

The loaded elastic element 18, coaxially arranged to the guide column 19b, is in contact with the back side of the enclosure 26, which houses the heat transfer plate 16. FIG. 4 shows how, according to one essential characteristic of the invention, both enclosures 26 that house the corresponding heat transfer plates 16 of the lower 4 and upper 3 subassemblies, are arranged opposing one another and are pressed against the rear faces (exterior to the cavity receiving the dough that is to be heated) of the corresponding heating plates 14, which results in an optimised heat transfer between the heat transfer plate 16 and the heating plates 14. When heating a brioche, and in particular when toasting a brioche, which is filled with a frozen product, it is very important to conduct the heating, or toasting, with a short period of time, as it is desired to heat, or toast, the brioche while its filling is still frozen, that is to say, before it melts. Therefore, it is important to ensure an optimised heat transfer between the heat transfer plates 16, the heating plates 14 and the brioche.

The assembly of the guide column 19 is attached to the half enclosures 15 and 17 that form said enclosures 26, and to the lower subassembly 4 using several fastening components, retention gaskets and threaded couplings, according to well-known solutions. The lower subassembly 4 is closed by means of a closing plate 21. The device 1 controller/switch 12 is included in one of the sides of the lower subassembly 4 that is arranged inside the junction box defined by an upper cover 23 and a lower cover 24.

FIG. 3a and FIG. 3b respectively illustrate an elevation view of the filled brioches heating device 1 and a view of a central sectional view of the same device 1 of FIG. 3a.

In order to simplify the portrayal of the components only the heat transfer plate 16 has been portrayed in FIG. 3b, omitting said multiple multilayer elements, which are connected therein, such as the heating thermal resistor 22, the aluminium plate 25b and an additional insulating layer 25a, located there between.

In FIG. 3b, the heating device 1 is shown in a closed position, equivalent to the one shown in FIG. 1a, in a cross section across the cavity 14a of the respective, mutually overlapping heating plates 14 of the upper 3 and lower 4 subassemblies. This view allows seeing how the heat transfer plates 16 are arranged inside the half enclosures 15 and 17 surrounded by a thermoinsulating layer 13, and the contact between the heat transfer plates 16 and the heating plate 14. It can also be seen how the tab 20 is coupled to the upper 3 and lower 4 subassemblies by means of the slots 3c and 4c, respectively.

Figure 3C:
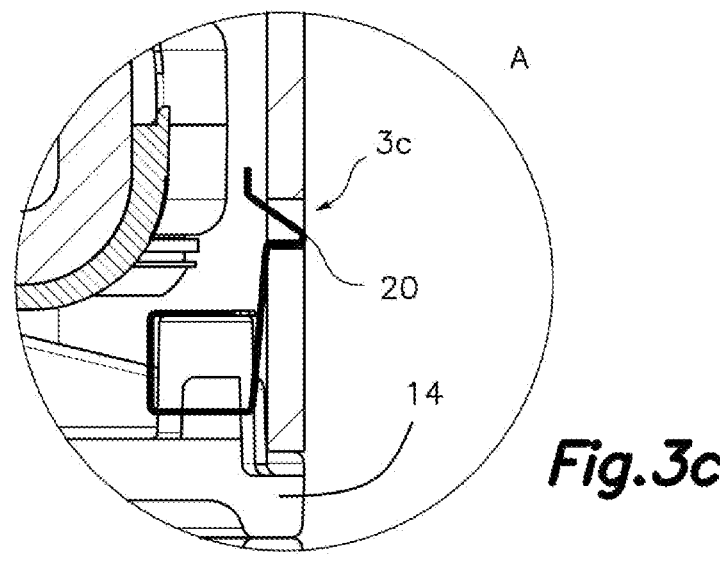

FIG. 3c illustrates a detail view A (shown in FIG. 3b) which shows how tab 20 is arranged inside one of the slots, specifically one of the slots 3c of the upper subassembly 3. By pressing or pushing the tabs 20, the tab 20 is releasing from the corresponding slot 3c, 4c, thereby allowing release of the corresponding heating plate 14 from the upper 3 and/or lower 4 subassemblies. In this way, the heating plates 14 can be easily removed from the corresponding subassembly 3,4 simply by hand, without needing any tool, such as, screwdrivers, etc. Likewise, the heating plates 14 can also be installed on the corresponding subassembly 3,4 in a fast and easy manner, without needing the use of any tool, simply by aligning the subassembly 3,4 and pushing it until the tabs 20 engage the corresponding slots 3c, 4c, thereby providing mechanical interference between the heating plate 14 and the corresponding subassembly 3,4.

As can be seen in FIG. 3b, the exemplary embodiment shown comprises two slots 3c, 4c on each subassembly 3, 4, each slot 3c, 4c being arranged on opposite faces of the device 1 for heating filled brioches, and in particular, on the front and back side of the device 1 for heating filled brioches. This configuration with two slots 3c,4c for each subassembly 3, 4 provides sufficient fixation between the heating element 14 and the corresponding subassembly 3, 4 while providing an ease of fixation and removal of said heating element 14 when needed. However, other embodiments could comprise a different number of slots 3c, 4c and tabs 20.

Ease of removal and installation of the heating elements 14 is important as the removal of the heating element 14 eases its cleaning and replacement in case of damage. It should be born in mind that as the heating elements 14 are envisaged for being in contact with foodstuff, it is of upmost importance the hygiene and cleanliness of the heating element 14, in particular the surface meant to be in contact with the foodstuff.

Moreover, removal of the heating elements 14 may ease inspection and maintenance of other internal elements of the device 1 for heating filled brioches, as for example, the enclosures 26.

A further benefit of such configuration of the heating elements 14 with the corresponding tabs 20 engaging corresponding slots 3c, 4c is that it is possible, to easily and speedily to replace a certain pair of heating elements 14 for other ones defining a cavity 14*a* with different characteristics, e.g., shape, pattern, etc. Furthermore, is it possible to replace the heating elements 14 for other ones configured for heating another type of foodstuff, for example, waffles, thereby increasing the versatility of the device 1.

The decorative closing plate 5 of this exemplary embodiment can have a pattern (see FIG. 1*a*) that matches or resembles the one of the cavities 14*a* of the heating plates 14. In this case, if the heating plates 14 are replaced by other ones having a cavity with a different shape and/or pattern, the decorative closing plate 5 may also be replaced accordingly.

Having a pattern on the closing plate 5 that matches or resembles the one of the cavities 14*a* eases the differentiation of each machine by the person in charge of operating them and heating the filled brioches.

As can be seen in the detail view of FIG. 3*a*, the with, i.e., vertical distance, of the slot 3*c*, is greater than the one of the tab 20, so that there is some degree of play between the tab 20 and the slot 3*c*. This, together with the elastic elements 18 and guide columns 19, allows a fine adjustment of the position of the heating elements 14 when the upper and lower subassemblies 3,4 are closed, thereby ensuring a perfect match and seal of the heating elements 14, which results in a perfect seal of the periphery of the brioche filled with a frozen product. When heating, and in particular, toasting, a brioche filled with a frozen dough filling, e.g., ice cream or frozen yogurt, it is of outmost importance a fast heating of the outermost part of the brioche, as otherwise the frozen dough filling can melt or lose its properties, resulting in a product of poor quality. The device 1 for heating filled brioches of the present invention allows toasting the surface of the brioche while keeping a frozen dough filling in its frozen state, FIG. 4 illustrates on a larger scale an elevation view of the device 1 for heating filled brioches, wherein the relative arrangement of each of the enclosures 26 can be see, in a closed position of the device, relative to the heating plate 14 in the interior of both upper 3 and lower 4 subassemblies.

Enclosure 26 is formed by two half enclosures 15 and 17 and it houses therein the heat transfer plate 16 (which, in this exemplary embodiment, has the heating thermal resistor 22 attached thereto, in addition to the aluminium plate 25*b* and an additional insulating layer 25*a* located there between), the thermoinsulating layer 13 wrapping said heat transfer plate 16 and the adjustable thermostat 2 in contact with the heating plate 14.

In FIG. 4, one of the aspects of the invention is illustrated with respect to the arrangement of the heat transfer element, included in said enclosures 26, which are elastically pressed by means of the guide column assembly 19 against the respective heating plates 14.

Figure 5:
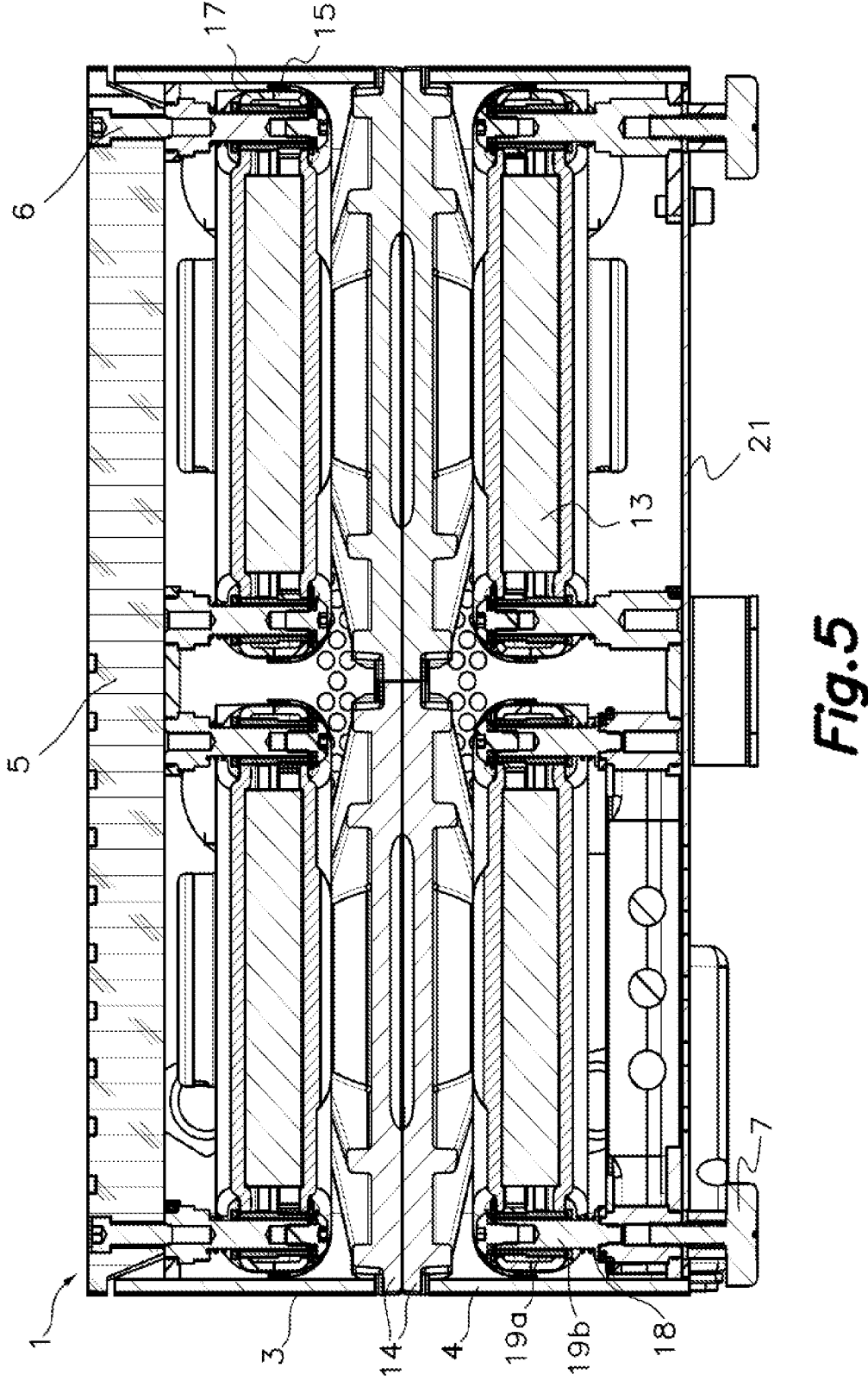
FIG. 5 shows a sectional view of the device, in an exemplary embodiment wherein said device has two independent brioche preparation areas in the same device.

FIG. 5 illustrates a profile section of another alternative exemplary embodiment of the filled brioches heating device 1 wherein said device 1 is formed by its respective upper 3 and lower 4 subassemblies, each of which, in this case, enables two distinct independent and separately adjusted areas, with their respective thermostat 2, for the preparation of filled brioches, preferably filled with ice cream.

What is claimed is:

1. A device for heating filled brioches, especially with a frozen dough filling, comprising:

an upper subassembly and a lower subassembly defining a base, the upper subassembly and the lower subassembly being hinged to one another;

wherein each of the upper subassembly and the lower subassembly comprises:

a casing;

at least one heating plate in thermal contact with a heat transfer plate having a heating thermal resistor attached thereto;

the at least one heating plate being provided with a substantially semi-spherical cavity configured to receive a filled brioche;

the at least one heating plate being removably coupled to the respective casing by at least one releasable fastening element configured to allow shifting of the at least one heating plate relative to the respective casing during operation; each releasable fastening element comprising at least one elastic tab engaging a corresponding slot formed in the respective casing, each slot having a vertical extension and each tab having a vertical extension, the vertical extension of the slot being greater than the vertical extension of the corresponding tab;

the heat transfer plate and the heating thermal resistor being housed in a thermal insulating enclosure supported within the respective subassembly;

loaded elastic elements configured to urge the thermal insulating enclosure against the at least one heating plate, ensuring, through an opening of said thermal insulation enclosure, contact between the heat transfer plate and the heating plate;

guide columns configured to guide shifting movement of the thermal insulating enclosure along a shifting stroke;

the thermal insulating enclosure comprising at least one thermostat configured to adjust the temperature of the heat transfer plate and a thermo-insulating layer, except for an open area, in correspondence to the opening of the thermal insulating enclosure, for abutment of the heat transfer plate with the heating plate; and wherein, the at least one heating plate of the upper subassembly and the at least one heating plate of the lower subassembly are arranged, in an operative position of the device, mutually opposed and overlapping one another; and the loaded elastic elements are configured to elastically urge the at least one heating plate of the upper subassembly and the opposed at least one heating plate of the lower subassembly, in the operative position of the device, through the shifting allowed by the corresponding releasable fastening elements.

2. The device according to claim 1, wherein said elastic elements are coaxially arranged relative to the guide columns, which rest on supports of said upper and lower subassemblies.

3. The device according to claim 1, wherein the thermal insulating enclosure is constituted by a coupling linkage of two half enclosures.

4. The device according to claim 1, wherein each heating plate is linked to its respective upper subassembly or lower subassembly by at least two releasable fastening elements arranged on opposite sides of the heating plate.

5. The device according to claim 1, wherein said heat transfer plate and said heating plate are quadrangular.

6. The device according to claim 2, wherein said elastic elements comprise four loaded springs, applied to each of the corners of the corresponding thermal insulating enclosure.

7. The device according to claim 1, wherein the lower subassembly comprises at least two independent heating plates, and the upper subassembly comprises at least two independent heating plates complementary to the heating plates of the lower subassembly.

8. The device according to claim 7, wherein the heat transfer plates in thermal contact with each group of two opposing heating plates respectively supported in the upper or lower subassembly are controlled by an independent regulating thermostat.

9. The device according to claim 1, which also comprises two or more light indicators wherein at least the first light indicator indicates the operative state of the device and wherein at least the second light indicator indicates whether the heat transfer plates have reached a predetermined temperature.

10. The device according to claim 1, wherein the heating thermal resistor, housed within the thermal insulating enclosure is attached and pressed against the heat transfer plate by means of an aluminium plate and fastening elements.

11. The device according to claim 10, further comprising an additional insulating layer between the aluminium plate and the heating thermal resistor.

12. The device according to claim 1, wherein each guide column, is supported on a support attached to each of the four corners of the interior of the casing that delimits each subassembly.

13. The device according to claim 1, wherein each thermostat is independent of the other.

14. The device according to claim 1, wherein each heating plate comprises a peripheral channel surrounding the substantially semi spherical cavity.

15. The device according to claim 1, wherein each heating plate comprises a sealing portion surrounding the substantially semi spherical cavity.

16. The device according to claim 15, wherein each heating plate comprises a peripheral channel surrounding the sealing portion.

* * * * *